United States Patent [19]

Miyamoto et al.

[11] Patent Number: 4,684,721
[45] Date of Patent: Aug. 4, 1987

[54] FIBER-REACTIVE PHTHALOCYANINE COMPOUND HAVING BOTH VINYLSULFONE TYPE AND DIHALOGENOTRIAZINYL GROUPS

[75] Inventors: Tetsuya Miyamoto, Takatsuki; Takashi Omura, Ashiya; Naoki Harada, Suita; Akira Takeshita, Oita, all of Japan

[73] Assignee: Sumitomo Chemical Company, Limited, Osaka, Japan

[21] Appl. No.: 835,788

[22] Filed: Mar. 3, 1986

[51] Int. Cl.[4] ............................................. C09B 47/04
[52] U.S. Cl. .................................................... 540/126
[58] Field of Search ........................................ 540/126

[56] References Cited

U.S. PATENT DOCUMENTS

| | | | |
|---|---|---|---|
| 4,267,107 | 5/1981 | Groll et al. | 540/126 |
| 4,268,267 | 5/1981 | Duchardt et al. | 540/126 X |
| 4,396,549 | 8/1983 | Nakamatsu et al. | 540/126 |
| 4,505,714 | 3/1985 | Omura et al. | 540/126 X |

FOREIGN PATENT DOCUMENTS

| | | |
|---|---|---|
| 0040806 | 12/1981 | European Pat. Off. . |
| 0073267 | 3/1983 | European Pat. Off. . |
| 0126025 | 11/1984 | European Pat. Off. . |
| 0126026 | 11/1984 | European Pat. Off. . |

Primary Examiner—Richard L. Raymond
Attorney, Agent, or Firm—Stevens, Davis, Miller & Mosher

[57] ABSTRACT

A phthalocyanine compound represented by the following formula,

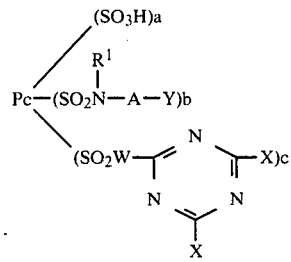

wherein Pc is a metal-containing or metal-free phthalocyanine residue, $R^1$ is a hydrogen atom or substituted or unsubstituted lower alkyl group, A is a substituted or unsubstituted phenylene or naphthylene group, Y is $-SO_2CH=CH_2$ or $-SO_2CH_2CH_2Z$, in which Z is a splittable group by the action of an alkali, W is a bridging group of the following formula,

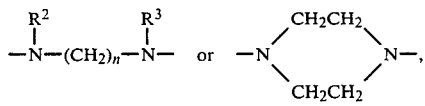

in which $R^2$ and $R^3$ are independently a hydrogen atom or a methyl or ethyl group, and n is an integer of from 2 through 6, X is a halogen atom, a is 0 or a number of not more than 2 ($0 \leq a \leq 2$), and b and c are independently a number of 1 through 3 ($1 \leq b \leq 3$, $1 \leq c \leq 3$), provided that the total of a, b and c is not more than 4 ($a+b+c \leq 4$), which is useful for dyeing or printing materials, particularly cellulose fiber materials, in a brilliant turquoise blue color excellent in various fastness properties.

5 Claims, No Drawings

FIBER-REACTIVE PHTHALOCYANINE COMPOUND HAVING BOTH VINYLSULFONE TYPE AND DIHALOGENOTRIAZINYL GROUPS

The present invention relates to a fiber-reactive phthalocyanine compound, a method for producing the same and a method for dyeing or printing materials using the same.

More specifically, the present invention relates to a phthalocyanine compound having both fiber-reactive groups, i.e. a so-called vinylsulfone type group and a dihalogenotriazinyl group, a method for producing the same and a method for dyeing or printing materials, particularly hydroxyl group- or amide group-containing fiber materials in a turquoise blue color using the phthalocyanine compound.

As known, there are many kinds of fiber-reactive dyes, and among them, reactive dyes having both a so-called vinylsulfone type reactive group such as β-sulfatoethylsulfonyl group, and a halogenotriazinyl group are particularly prominent because of their characteristic dye performances. As phthalocyanine dyes of this kind, Published Examined Japanese Patent Application No. 26488/1963 discloses a phthalocyanine compound represented by the following formula in a free acid form,

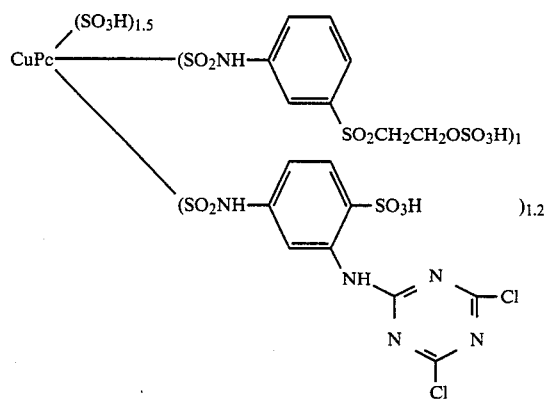

wherein CuPc is a copper phthalocyanine residue. Generally speaking, in order to be commercialized, fiber-reactive dyes are required to be superior in various dye performances such as fastness properties, solubility, exhaustion and fixing abilities, build-up, level-dyeing and wash-off properties, and insusceptibility to changes in dyeing temperatures and bath ratios. In order to be commercially accepted, the above known phthalocyanine compound waits for an improvement in such various dye performances.

The present inventors have undertaken extensive studies to find a fiber-reactive phthalocyanine compound meeting with such requirements, and found a novel phthalocyanine compound.

The present invention provides a phthalocyanine compound represented by the following formula (I) in a free acid form,

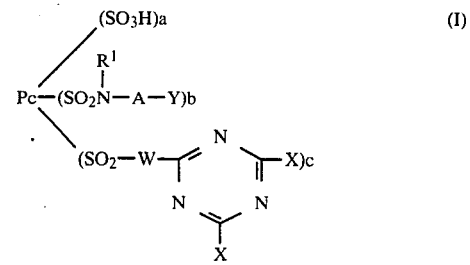

wherein Pc is a metal-containing or metal-free phthalocyanine residue, $R^1$ is a hydrogen atom or a substituted or unsubstituted lower alkyl group, A is a substituted or unsubstituted phenylene or naphthylene group, Y is $-SO_2CH=CH_2$ or $-SO_2CH_2CH_2Z$, in which Z is a splittable group by the action of an alkali, W is a bridging group of the following formula

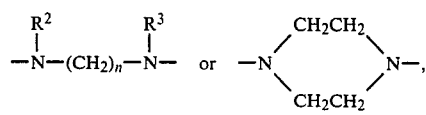

in which $R^2$ and $R^3$ are independently a hydrogen atom or a methyl or ethyl group, and n is an integer of from 2 through 6, X is a halogen atom, a is 0 or a number of not more than 2 ($0 \leq a \leq 2$), and b and c are independently a number of from 1 through 3 ($1 \leq b \leq 3$, $1 \leq c \leq 3$), provided that the total of a, b and c is not more than 4 ($a+b+c \leq 4$), and a method for producing the phthalocyanine compound of the formula (I), which comprises (1) reacting a phthalocyanine sulfochloride with an arylamine compound represented by the following formula (II),

wherein $R^1$, A and Y are as defined above, and a diamine compound selected from piperazine and compounds represented by the following formula (III),

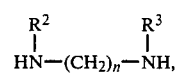

ps wherein $R^2$, $R^3$ and n are as defined above, to obtain an intermediate compound represented by the following formula in a free acid form (IV),

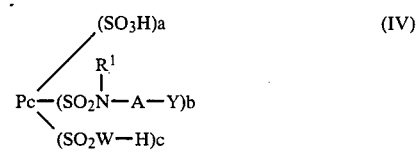

wherein Pc, W, $R^1$, A, Y, a, b and c are as defined above, and then reacting the intermediate compound of the formula (IV) with a trihalogenotriazine represented by the following formula (V),

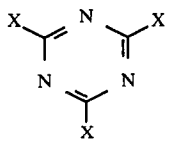

(V)

wherein X is as defined above, or (2) reacting the diamine compound with the trihalogenotriazine of the formula (V) to obtain a dihalogenotriazine compound represented by the following formula (VI),

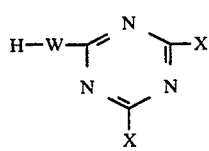

(VI)

wherein W and X are as defined above, and then reacting the phthalocyanine sulfochloride with the dihalogenotriazine compound of the formula (VI) and the arylamine compound of the formula (II).

The present invention also provides a method for dyeing or printing materials, which comprises using the phthalocyanine compound of the formula (I).

In the formula (I), a preferred phthalocyanine residue Pc is a metal-containing one. The metals include cobalt, nickel and copper, preferably nickel and copper.

A preferred bridging group W is that of the formula,

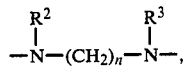

wherein $R^2$, $R^3$ and n are as defined above. Particularly preferred are those having hydrogen atoms as $R^2$ and $R^3$, and 2 or 3 as n.

With respect to the unsubstituted or substituted alkyl group represented by $R^1$, the alkyl is preferably the one having 1 to 4 carbon atoms, and the substituent includes, for example, a halogen atom and a hydroxyl, cyano, alkoxy, carboxy, carbamoyl, alkoxycarbonyl, alkylcarbonyloxy, sulfo or sulfamoyl group. Examples of preferred $R^1$ are hydrogen, methyl, ethyl, n-propyl, isopropyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbuyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfoamoylpropyl, 4-sulfamoylbutyl, and the like. Of these, particularly preferred is hydrogen.

The phenylene group A includes those unsubstituted or substituted with one or two members selected from, for example, methyl, ethyl, methoxy, ethoxy, chlorine, bromine and sulfo, and the naphthylene group A includes those unsubstituted or substituted with one sulfo. Preferred examples thereof are as follows:

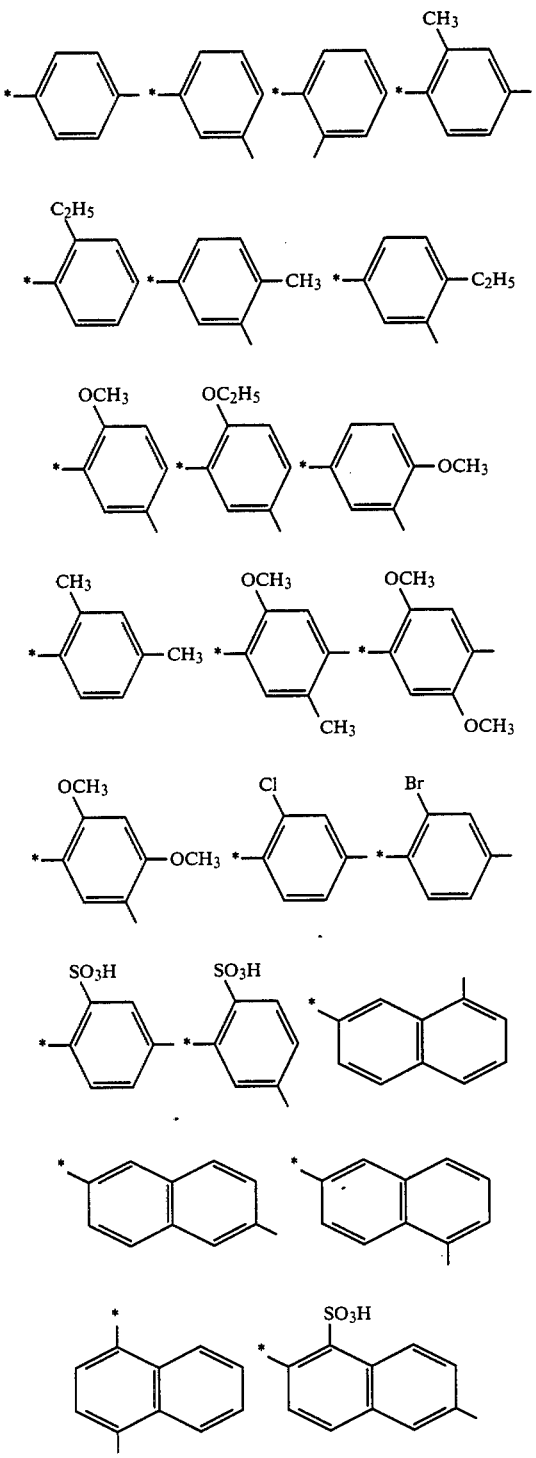

-continued

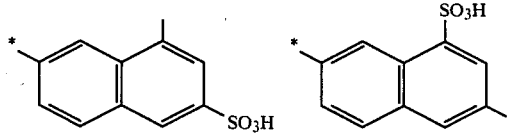

(In the above formula, the asterisked linkage is bonded to

)

The splittable group Z includes sulfuric acid ester group, thiosulfuric acid ester group, phosphoric acid ester group, acetic acid ester group and halogen atom. Of these, preferred is sulfuric acid ester group, and thus preferred Y is $-SO_2CH_2CH_2OSO_3H$.

The halogen atom X includes chlorine, bromine and fluroine. Of these, preferred are chlorine and fluorine, particularly chlorine.

The phthalocyanine compound of the formula (I) provided by the present invention is usually in a mixture of two or more. In other words, a, b and c are each average number. Exceptionally, however, the phthalocyanine compound (I) may be a single compound. That is, a b and c may be an integer.

The phthalocyanine compound (I) may be in a free acid or preferably in a salt of alkali metal or alkaline earth metal. Of these, preferred are sodium, potassium and calcium salts.

Among the phthalocyanine compounds of the formula (I), preferred are those having the following formula in a free acid form,

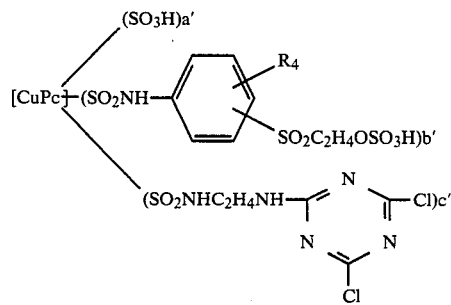

wherein CuPc is a copper phthalocyanine residue, $R^4$ is a hydrogen atom or a sulfo or methoxy group, and a', b' and c' are independently a number of 1 to 2, provided that the total of a', b' and c' is not more than 4.

The phthalocyanine compound of the formula (I) can be produced, for example, in the following manner.

A mixture of phthalocyanine sulfochloride, the diamine compound selected from piperazine and compounds of the formula (III), and the arylamine compound (II) can be subjected to condensation reaction, obtaining the intermediate compound of the formula (IV). The condensation can be carried out in an aqueous medium at a temperature ranging from 0° to 50° C., while controlling the pH within a range of 5 to 9. Successively, the intermediate compound-containing reaction mixture can be subjected to condensation with the trihalogenotriazine of the formula (V). The condensation can be carried out in an aqueous medium at a temperature ranging from 0° to 50° C., while controlling the pH within a range of 2 to 8, thus obtaining the desired phthalocyanine compound (I).

Alternatively, a mixture of the diamine compound and the trihalogenotriazine (V) can be subjected to condensation reaction, obtaining the dihalogenotriazine compound of the formula (VI). The condensation can be carried out in an aqueous medium at a temperature ranging from 0° to 30° C., while controlling the pH within a range of 5 to 9. Then, the phthalocyanine sulfochloride can be subjected to first condensation with any one of the arylamine compound (II) and the above dihalogenotriazine compound-containing reaction mixture, followed by second condensation with the remaining one, thus obtaining the desired phthalocyanine compound (I). The first and second condensation reactions can be carried out in an aqueous medium at a temperature of 0° to 30° C., while controlling the pH within a range of 5 to 9, and at a temperature of 10° to 50° C., while controlling the pH within a range of 5 to 9, respectively.

The phthalocyanine compound (I) produced in accordance with the present invention may be in a liquid form obtainable by removing inorganic salts and/or adding a dyeing improver, if necessary, after completion of the reaction, or may be formed into a powdery product by subjecting the above liquid or the reaction mixture as such to evaporation such as spray-drying and the like, or into either liquid or powdery product through salting out of the desired compound in a conventional manner using an electrolyte.

The compound (I) of the present invention has fiber-reactive groups, and can be used for dyeing or printing hydroxyl group- or amide group-containing materials, which are preferably in a fibrous form. The fiber materials may be blended products.

The hydroxyl group-containing materials include natural or synthetic hydroxyl group-containing fiber materials such as cellulose fiber materials, cellulose-containing fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polymide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the compound (I) by an exhaustion dyeing, padding or printing method.

The exhaustion dyeing can be carried out at a relatively low temperature in the presence of an acid binding agent such as sodium carbonate, trisodium phosphate, sodium hydroxide and the like, if desired using a neutral salt such as sodium sulfate, sodium chloride and the like, optionally together with dissolving assistants, penetrants or level dyeing agents. The neutral salt which can be used for promoting exhaustion of the dye may be added to a dye bath at the time when a temperature reaches a level desired for the dyeing, or prior thereto. Alternatively, the neutral salt may be added thereto dividedly.

The padding can be carried out by padding the fiber materials at ambient temperature or an elevated temperature, and after drying, steaming or dry-heating the materials to perform the dye-fixation.

The printing can be carried out in a one-phase or two-phase manner. The one-phase printing may be conducted by printing the fiber materials with a printing paste containing an acid binding agent such as sodium hydrogen carbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or overpadding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or a dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogen carbonate, sodium carbonate, sodium formate, potassium carbonate, sodium hydrogen phosphate, disodium hydrogen phosphate, trisodium phosphate, sodium silicate, sodium trichloraacetate and the like.

The dyeing of natural or synthetic polyamide and polyurethane fiber materials can be carried out by performing exhaustion in an acid or weak acid bath, while controlling the pH to a desired value, and then making the bath neutral, or in some cases alkaline to perform the fixation. The dyeing temperautre ranges usually from 60° to 120° C. In order to achieve a level dyeing, there may be used a conventional level dyeing agent such as a condensation product between cyanuric chloride and 3 times by mole of aminobenzensulfonic aicd or aminonaphthalenesulfonic acid, or an addition product between stearylamine and ethylene oxide, and the like.

The present compound can be characterized by excellent dye performances in the dyeing or printing of fiber materials, particularly cellulose fiber materials. For example, the compound can give a dyed product excellent in light fastness, wet fastness such as washing resistance, peroxide-washing resistance, acid-hydrolysis resistance and alkali resistance, and abrasion fastness and iron fastness. The compound can also exhibit excellent build-up, level-dyring and wash-off properties, favorable solubility and high exhaustion and fixation percentages. Moreover, the compound can hardly be affected by changes in a dyeing temperature and a dyeing bath ratio, so that a dyed product with a constant quality can be given with superior reproducibility.

The present invention is illustrated in more detail with reference to the following Examples, which are only illustrative and are not intended to limit the scope of the present invention. In Examples, parts and % are by weight, and CuPc and NiPc are copper phthalochyanine residue and nickel phthalocyanine residue, respectively.

EXAMPLE 1

Copper phthalocyanine tetrasulfochloride (97 parts on a dry basis) in a wet cake was suspended thoroughly in ice water (500 parts), and ethylenediamine (6 parts) and aniline-4-$\beta$-sulfatoethylsulfone (28 parts) were added thereto. The mixture was gradually heated to 30° C., and stirred at that temperature at that temperature for 15 hours, during which the pH was kept within a range of 6 to 8 using a 15% aqueous sodium carbonate solution. Thereafter, the reaction mixture was cooled to 5° C., and mixed with cyanuric chloride (18 parts). The mixture was stirred at a temperature of between 5° and 20° C., while keeping the pH within a range of 6 to 8, until the condensation was completed to obtain a phthalocyanine compound of the following formula in a free acid form.

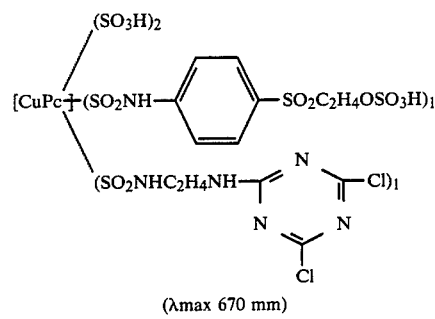

($\lambda$max 670 mm)

The phthalocyanine compound obtained was readily dissolved in water to show a blue color. When used as a fiber-reactive dye, the compound can give a dyed or printed product of a brilliant turquoise blue color having excellent fastness properties such as light fastness and wet fastness including washing resistance, acid-hydrolysis resistance and alkali resistance.

EXAMPLE 2

Copper sulfophthalocyanine trisulfochloride (95 parts on a dry basis) in a wet cake was suspended thoroughly in ice water (400 parts), and ethylenediamine (9 parts) and aniline-4-$\beta$-sulfatoethylsulfone (30 parts) were added thereto. The mixture was gradually heated to 25° C., and stirred at that temperature for 20 hours, during which the pH was controlled within a range of 6 to 8 using a 15% aqueous sodium carbonate solution. Thereafter, the reaction mixture was cooled to 5° C., and then mixed with cyanuric chloride (28 parts). The mixture was stirred at a temperature of between 10° and 20° C., while controlling the pH within a range of 6 to 8, until the condensation reaction was completed to obtain a phthalocyanine compound of the following formula,

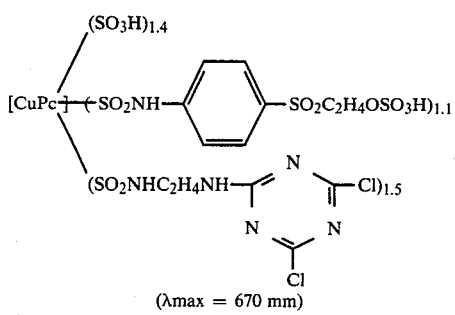

(λmax = 670 mm)

The compound obtained was readily dissolved in water to show a blue color. When used as a fiber-reactive dye, the compound can give a dyed or printed product of a brilliant turquoise blue color having excellent fastness properties like in Example 1.

EXAMPLE 3

Copper phthalocyanine trisulfochloride (87 parts on a dry basis) in a wet cake was suspended thoroughly in ice water (550 parts), and then ethylenediamine (6 parts and aniline-3-β-sulfatoethylsulfone (42 parts) were added thereto. The mixture was heated to 30° C., and stirred at that temperature for 15 hours, during which the pH was controlled within a range of 6 to 8 using a 20% aqueous sodium carbonate solution. Thereafter, the reaction mixture was cooled to 5° C., and then mixed with cyanuric chloride (18 parts), and the mixture was stirred at a temperature of between 5° and 15° C., while controlling the pH within a range of 6 to 8, until the condensation reaction was completed to obtain a phthalocyanine compound of the following formula.

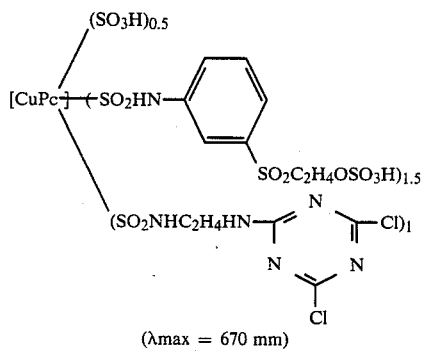

(λmax = 670 mm)

The compound obtained was readily dissolved in water to show a blue color. When used as a fiber-reactive dye, the compound can give a dyed or printed product of a brilliant blue color excellent in fastness properties like in Example 1.

EXAMPLE 4

Cyanuric chloride (18 parts) was suspended thoroughly in water (200 parts) cooled to 5° C., and then ethylenediamine (6 parts) was added thereto. The mixture was stirred at that temperature to complete the condensation, while controlling the pH within a range of 5 to 7.

On the other hand, copper phthalocyanine tetrasulfochloride (97 parts on a dry basis) in a wet cake was suspended thoroughly in ince water (400 parts), and then aniline-3-β-sulfatoethylsulfone (28 parts) was added thereto. The mixture was stirred at 10° to 20° C. for 5 hours, during which the pH was controlled within a range of 6 to 7 using a 15% aqueous sodium carbonate solution. To this reaction mixture was added the above cyanuric chloride-ethylenediamine reaction mixture, and the resulting mixture was gradually heated to 30° C. and stirred at that temperature for 15 hours, during which the pH was controlled within a range of 6 to 8, thus obtaining a phthalocyanine compound the following formula.

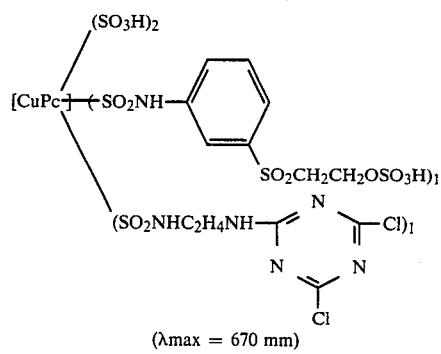

(λmax = 670 mm)

The compound obtained was readily dissolved in water to show a blue color. When used as a fiber-reactive dye, the compound can give a dyed or printed product of a brilliant tarquoise blue color excellent in fastness properties like in Example 1.

EXAMPLES 5 TO 58

In a manner similar to any one of Examples 1 to 4, each phthalocyanine compound corresponding to the following formula (VII) can be obtained. In this manner, the kinds and amounts of the phthalocyanine sulfochloride, diamine compounds, arylamine compound and cyanuric chloride can be determined so as to correspond to each phthalocyanine compound shown in the following Table.

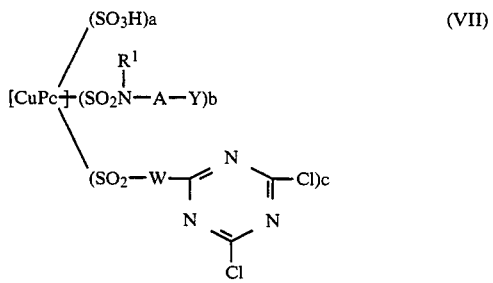

| Example No. | —W— | —R$^1$ | —A—Y | a | b | c | Color |
|---|---|---|---|---|---|---|---|
| 5 | —N(CH$_2$)$_2$N— <br> H    H | H | ⟨benzene ring⟩—OCH$_3$ <br> SO$_2$CH$_2$CH$_2$OSO$_3$H | 2 | 1 | 1 | Turquoise blue |

-continued

| Example No. | -W- | -R¹ | -A-Y | a | b | c | Color |
|---|---|---|---|---|---|---|---|
| 6 | " | " | 4-methoxy-3-methylphenyl-SO₂CH₂CH₂OSO₃H | " | " | " | " |
| 7 | " | " | 2,5-dimethyl-4-methoxyphenyl-SO₂CH₂CH₂OSO₃H | " | " | " | " |
| 8 | " | " | 2,5-dimethyl-4-methoxyphenyl-SO₂CH₂CH₂OSO₃H | " | " | " | " |
| 9 | " | —CH₃ | phenyl-SO₂CH₂CH₂OSO₃H | " | " | " | " |
| 10 | " | —CH₂CH₃ | " | " | " | " | " |
| 11 | " | —CH₂CN | " | " | " | " | " |
| 12 | " | —CH₂CONH₂ | " | " | " | " | " |
| 13 | " | —CH₂CO₂H | " | " | " | " | " |
| 14 | " | —CH₂CH₂OH | " | " | " | " | " |
| 15 | " | —CH₂CH₂OCH₃ | " | " | " | " | " |
| 16 | " | —CH₂CH₂CN | " | " | " | " | " |
| 17 | " | —CH₂CH₂CONH₂ | " | " | " | " | " |
| 18 | " | —CH₂CH₂CH₃ | " | " | " | " | " |
| 19 | " | —CH₂CH₂SO₂NH₂ | " | " | " | " | " |
| 20 | " | —CH₂CH(OH)CH₃ | " | " | " | " | " |
| 21 | " | —CH(OH)CH₂CH₃ | " | " | " | " | " |
| 22 | " | —CH₂CH₂SO₃H | " | " | " | " | " |
| 23 | —NH(CH₂)₃NH— | H | phenyl-SO₂CH₂CH₂OSO₃H | " | " | " | " |
| 24 | " | —CH₂CH₃ | " | " | " | " | " |
| 25 | —NH(CH₂)₄NH— | H | " | " | " | " | " |
| 26 | " | —CH₂CH₃ | " | " | " | " | " |
| 27 | —NH(CH₂)₅NH— | H | " | " | " | " | " |
| 28 | " | —CH₂CH₃ | " | " | " | " | " |
| 29 | —NH(CH₂)₆NH— | H | " | " | " | " | " |
| 30 | " | —CH₂CH₃ | " | " | " | " | " |
| 31 | —N(CH₃)(CH₂)₂N(CH₃)— | H | " | " | " | " | " |
| 32 | —N(CH₃)(CH₂)₂N(CH₃)— | —CH₂CH₃ | " | " | " | " | " |

-continued

| Example No. | —W— | —R¹ | —A—Y | a | b | c | Color |
|---|---|---|---|---|---|---|---|
| 33 | —N(CH₂CH₂)₂N— (piperazine ring) | H | " | " | " | " | " |
| 34 | " | —CH₂CH₃ | " | " | " | " | " |
| 35 | —N(CH₂)₂N—<br>H   H | H | " | 1.5 | 1 | 1.5 | " |
| 36 | " | " | " | 1.5 | 1.5 | 1 | " |
| 37 | " | " | " | 1 | 1.5 | 1.5 | " |
| 38 | " | " | " | 1 | 1 | 1 | " |
| 39 | " | " | " | 0.5 | 1 | 1.5 | " |
| 40 | " | " | " | 0.5 | 1.5 | 1 | " |
| 41 | —N(CH₂)₃N—<br>H   H | " | " | 1.5 | 1.5 | 1 | " |
| 42 | " | " | " | 1.5 | 1 | 1.5 | " |
| 43 | —N(CH₂)₂N—<br>H   H | " | —C₆H₄—SO₂CH=CH₂ (para) | 2 | 1 | 1 | " |
| 44 | " | " | —C₆H₄—SO₂CH₂CH₂Cl (para) | " | " | " | " |
| 45 | " | " | —C₆H₄—SO₂CH₂CH₂OCOCH₃ (para) | " | " | " | " |
| 46 | " | " | —C₆H₄—SO₂CH₂CH₂OPO₃H₂ (para) | " | " | " | " |
| 47 | " | " | —C₆H₄—SO₂CH=CH₂ (meta) | " | " | " | " |
| 48 | " | " | 2,6-naphthyl—SO₂CH₂CH₂OSO₃H | " | " | " | " |
| 49 | " | " | naphthyl with SO₂CH₂CH₂OSO₃H and SO₃H | " | " | " | " |
| 50 | —N(CH₂)₃N—<br>H   H | " | —C₆H₄—SO₂CH₂CH₂OSO₃H (meta) | " | " | " | " |
| 51 | " | —CH₂CH₃ | " | " | " | " | " |
| 52 | —N(CH₂)₂N—<br>H   H | " | —C₆H₄—SO₂CH₂CH₂OSO₃H (para) | " | " | " | " |
| 53 | " | " | —C₆H₃(OCH₃)—SO₂CH₂CH₂OSO₃H | " | " | " | " |
| 54 | " | " | —C₆H₄—SO₂CH=CH₂ (para) | " | " | " | " |

-continued

| Example No. | Compound corresponding to the formula (VII) | | | a | b | c | Color |
|---|---|---|---|---|---|---|---|
| | —W— | —R¹ | —A—Y | | | | |
| 55 | " | " | phenyl-SO₂CH=CH₂ | " | " | " | " |
| 56 | " | " | phenyl-SO₂CH₂CH₂OSO₃H | " | " | " | " |
| 57 | " | " | phenyl-SO₂CH₂CH₂Cl | " | " | " | " |
| 58 | " | " | phenyl-SO₂CH₂CH₂Cl | " | " | " | " |

EXAMPLE 59

Example 1 was repeated, provided that nikel phthalocyanine tetrasulfochloride was used in an equimolar amount to that of the copper phthalocyanine tetrasulfochloride used in Example 1, thereby obtaining a phthalocyanine compound of the following formula,

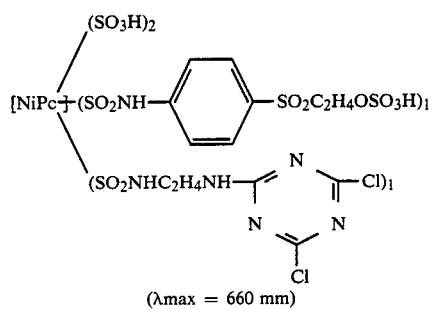

($\lambda$max = 660 mm)

The compound obtained was readily dissolved in water to show a deep green color. When used as a fiber-reactive dye, the compound can give a dyed or printed product of a brilliant green color excellent in fastness properties such as light fastness and wet fastness including washing resistance, acid-hydrolysis resistance and alkali resistance.

EXAMPLE 60

Copper phthalocyanine tetrasulfochloride, ethylenediamine and aniline-4-$\beta$-sulfatoethylsulfone were subjected to condensation in the same manner as in Example 1. To this reaction mixture cooled to 0° C. was dropwise added 2,4,6-trifluoro-1,3,5-triazine (14 parts) along with a 15% aqueous sodium carbonate solution to control the pH within a range of 6 to 8, and the mixture was stirred at 50° to 10° C. and at that pH to complete the condensation, thus obtaining a phthalocyanine compound of the following formula.

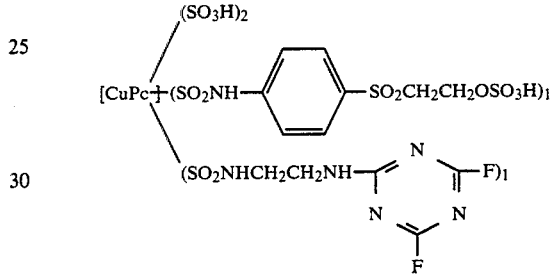

EXAMPLE 61

The phthalocyanine compound (0.1, 0.3 and 0.6 part) obtained in Example 1 was respectively dissolved in water (200 parts). To each solution were added sodium sulfate (10 parts) and cotton (10 parts). The dyeing bath was heated to 60° C. and then sodium carbonate (4 parts) was added thereto. Dyeing was continued at that temperature for 1 hour. The cotton was washed with water, soaped, again washed with water and then dried to obtain a dyed product of a brilliant turquoise blue color excellent in fastness properties such as light fastness and wet fastness.

From the results of the above three dyeings, the compound was found to be excellent in solubility, build-up and level-dyeing properties and reproducibility.

EXAMPLE 62

The phthalocyanine compound (3 parts) obtained in Example 2 was dissolved in water (2000 parts), and sodium sulfate (200 parts) and cotton (100 parts) were added thereto. The bath was heated to 50° C. 30 Minutes thereafter, sodium hydroxide (30 parts) were added thereto, and dyeing was continued for 1 hour at that temperature. The cotton was washed with water, soaped, again washed with water and then dried to obtain a dyed product of a brilliant turquoise blue color having excellent fastness properties like in Example 61.

EXAMPLE 63

| Composition of color paste | |
|---|---|
| Compound obtained in Example 1 | 5 parts |

-continued

| Composition of color paste | |
|---|---|
| Urea | 5 parts |
| Sodium alginate (5%), thickener | 50 parts |
| Hot water | 25 parts |
| Sodium hydrogencarbonate | 2 parts |
| Balance (water) | 13 parts |

Mercerized cotton broad cloth was printed with the color paste of the above composition, then pre-dried, steamed for 5 minutes at 100° C., rinsed with hot water, soaped, again rinsed with hot water, and dried to obtain a printed product of a brilliant turquoise blue color excellent in fastness properties, particularly light fastness and wet fastness.

What is claimed is:

1. A phthalocyanine compound represented by the following formula in a free acid form,

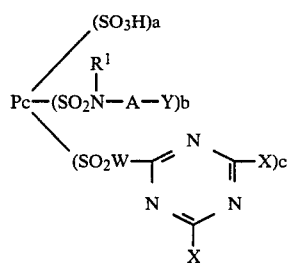

wherein Pc is a metal-containing or metal-free phthalocyanine residue, $R^1$ is hydrogen or a lower alkyl unsubstituted or substituted with halogen, hydroxyl, cyano, alkoxy, carboxy, carbamoyl, alkoxycarbonyl, alkylcarbonyloxy, sulfo, or sulfamoyl, A is phenylene unsubstituted or substituted with one or two members selected from the group consisting of methyl, ethyl, methoxy, ethoxy, chlorine, bromine and sulfo, or naphthylene unsubstituted or substituted with sulfo, Y is $-SO_2CH=CH_2$ or $-SO_2CH_2CH_2Z$, in which Z is a group splittable by the action of an alkali, W is a bridging group of the following formula,

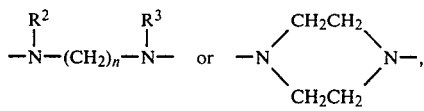

in which $R^2$ and $R^3$ are independently hydrogen, methyl or ethyl, and n is an integer of from 2 through 6, X is a halogen, a is 0 or a number of not more than 2 ($0 \leq a \leq 2$), and b and c are independently a number of 1 through 3 ($1 \leq b \leq 3$, $1 \leq c \leq 3$), provided that the total of a, b and c is not more than 4 ($a+b+c \leq 4$).

2. The compound according to claim 1, wherein the phthalocyanine residue is copper or nickel phthalocyanine residue.

3. The compound according to claim 1, wherein the bridging group is $-NH(CH_2)_2NH-$ or $-NH(CH_2)_3NH-$.

4. The compound according to claim 1, wherein $R^1$ is a hydrogen atom.

5. A phthalocyanine compound represented by the following formula in a free acid form,

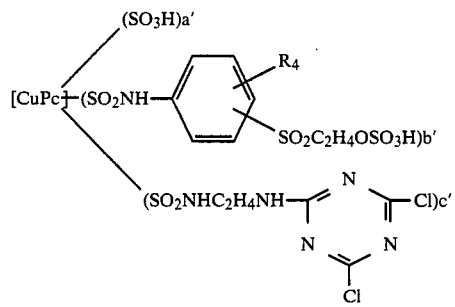

wherein CuPc is a copper phthalocyanine residue, $R^4$ is hydrogen, sulfo, or methoxy, and a', b' and c' are independently a number of 1 to 2, provided that the tota of a', b' and c' is not more than 4.

* * * * *